Nov. 10, 1964   E. R. FORSMAN ETAL   3,156,161
PRESSURE FLUID ACTUATED FRACTIONAL ROTATION
OPERATOR FOR VALVES AND THE LIKE
Filed April 10, 1963   2 Sheets-Sheet 1
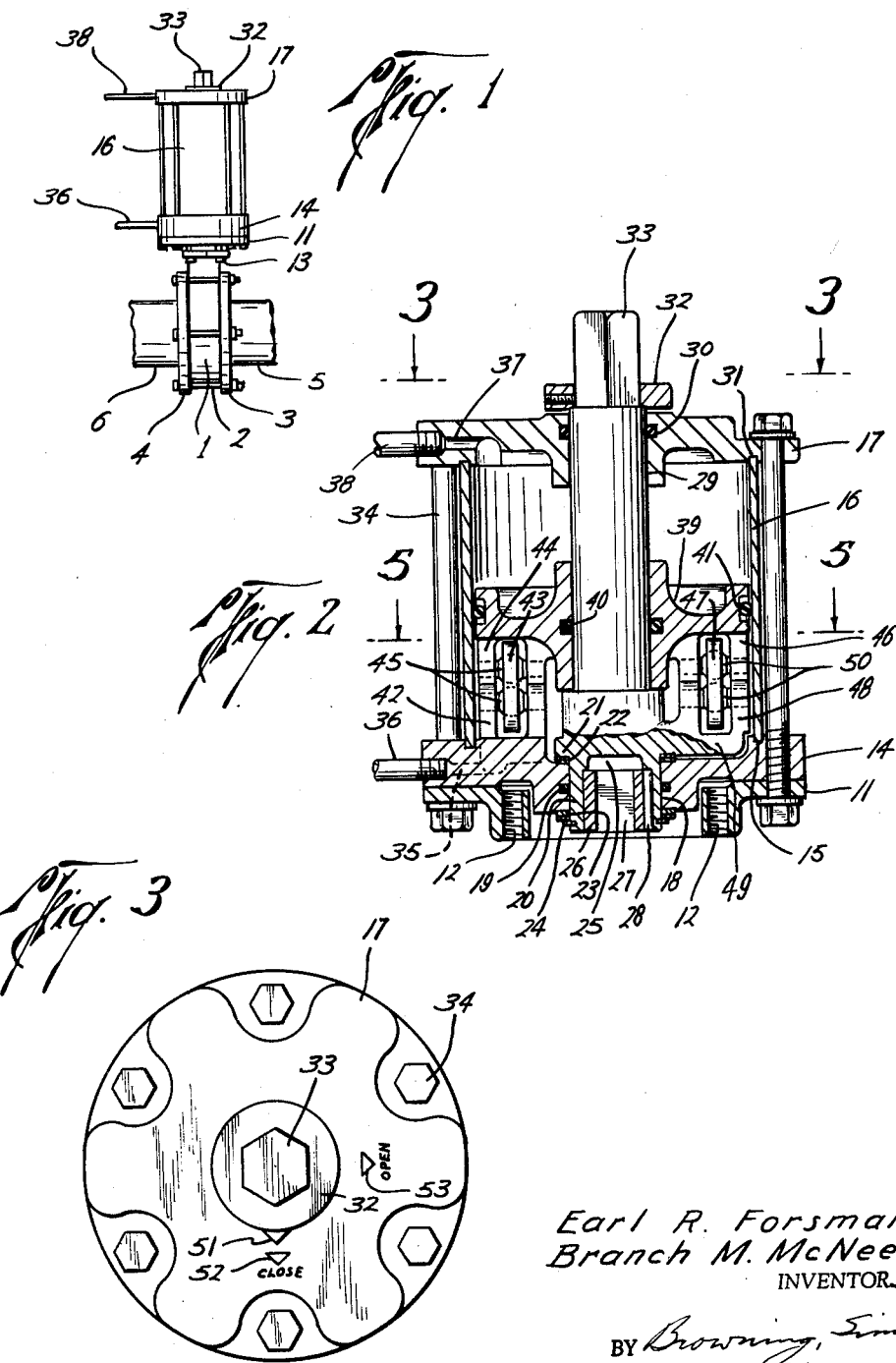
Earl R. Forsman
Branch M. McNeely
INVENTORS
BY Browning, Simms,
Hyer + Eickenroht
ATTORNEYS

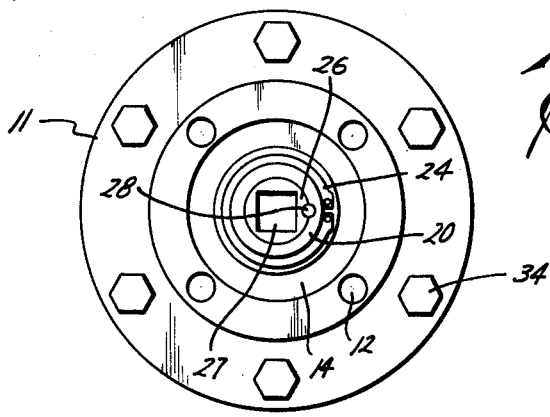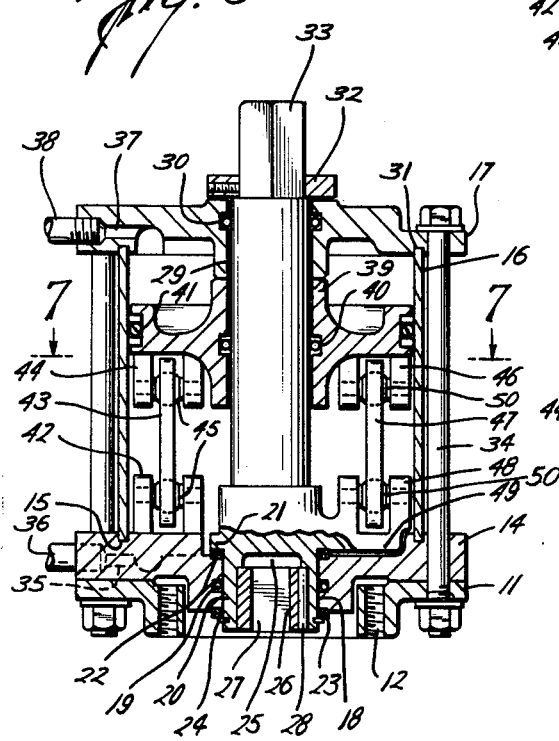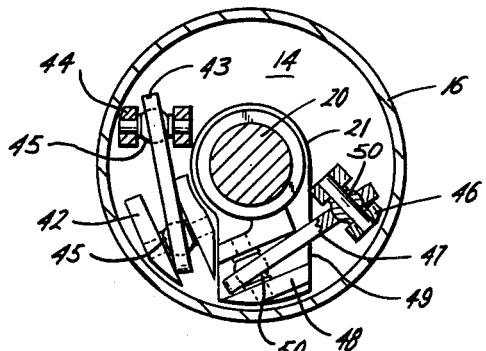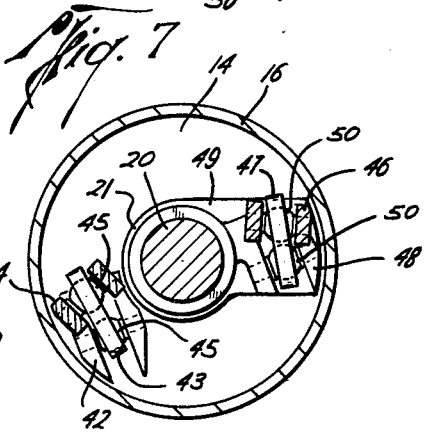
Earl R. Forsman
Branch M. McNeely
INVENTORS

United States Patent Office 3,156,161
Patented Nov. 10, 1964

3,156,161
PRESSURE FLUID ACTUATED FRACTIONAL ROTATION OPERATOR FOR VALVES AND THE LIKE
Earl R. Forsman and Branch M. McNeely, Houston, Tex., assignors to Keystone Valve Corp., Houston, Tex., a corporation of Texas
Filed Apr. 10, 1963, Ser. No. 271,920
7 Claims. (Cl. 92—33)

This invention relates to a pressure fluid actuated fractional rotation operator of the type adapted to operate devices such as disc and plug valves and other apparatus requiring rotation less than one complete turn.

It will be understood that the operator of this invention, while particularly adapted for actuation of valves such as those of the character above mentioned, is not limited to such usage. However, it is intended for usage in locations which may be relatively inaccessible by means of remoteness from the scene of actuation, or for use in locations remote from a point where a change of conditions may be utilized to trigger automatic actuation of the operator.

Of course, pressure fluid actuated operators for causing fractional rotation have previously been devised but for the most part these have required excessive space due to linkages and arrangements required, difficult packing and sealing arrangements having short life and requiring frequent attention and involving exposed linkages and other moving parts exposed to damage or interference from external objects.

It is an object of the present invention to provide a compact trouble-free operator of the type mentioned.

Another object is to provide such an operator which is not only compact but completely enclosed and in which the movable hydraulically driven element is coaxial with the fractional rotation which it produces.

Another object is to provide such an operator in which only the simplest of packings and seals will be required.

Another object is to provide such an operator in which there will be no exposed moving parts subject to being tampered with or to damage from external sources.

Another object is to provide such an operator which, if desired, may be arranged so that when it is actuated to cause rotation in one direction it cannot be retracted manually without being disassembled, but which may be retracted by fluid pressure.

Other objects and advantages of this invention will become apparent from the following description taken in connection with the accompanying drawings in which is illustrated one embodiment of the invention.

In the drawings:

FIG. 1 is a side elevation of an operator constructed in accordance with this invention located in operative position on a disc-type valve incorporated in a pipeline of which fragmentary ends are illustrated.

FIG. 2 is a longitudinal cross section through the operator illustrated in FIG. 1, on an enlarged scale.

FIG. 3 is a top plan view of the operator illustrated in FIG. 2 taken along the line 3—3 of FIG. 2.

FIG. 4 is a bottom plan view of the operator illustrated in FIG. 2.

FIG. 5 is a transverse cross section through the operator illustrated in FIG. 2 taken along the line 5—5 of FIG. 2 and showing the parts in the position they occupy in that one extreme position of the apparatus illustrated in FIG. 2.

FIG. 6 is a view similar to FIG. 2 but showing the parts in the opposite extreme position from that shown in FIGS. 2 and 5.

FIG. 7 is a view similar to FIG. 5 but showing the parts in the opposite extreme position illustrated in FIG. 6, being a transverse cross section taken along the line 7—7 of FIG. 6.

Referring more specifically to the drawings, the numeral 1 indicates a valve of the so-called disc-type mounted and clamped by means such as bolts 2 between flanges 3 and 4 on the ends 5 and 6 of a pipeline, flow through which is to be controlled by the valve.

The operator is shown as being provided with a base plate 11 having tapped holes therein at 12 by means of which it may be secured by capscrews 13 or the like to a flange on the body of the valve so that the base plate 11 will be concentric with the usual valve stem and will be anchored to and become for operating purposes an integral part of the valve body.

In the form illustrated a first cylinder head 14 is mounted directly against the base plate 11 and is provided in its surface opposite the base plate 11 with a groove 15 adapted to receive a cylinder 16. A second cylinder head 17 is carried on the opposite end of the cylinder 16 to provide the complete cylinder and cylinder head combination.

The first cylinder head 14 is provided with an opening 18 therethrough having a suitable seal therein, such as the groove 19 receiving an O-ring or other suitable sealing means adapted to seal about the lower end portion of a shaft 20 mounting it for rotation in the cylinder head 14. The shaft 20 is provided with suitable thrust bearing means to prevent it from axial movement with respect to the cylinder head 14 while permitting it to rotate therein, this thrust bearing means being provided in the illustration by a flange 21 on the shaft 20 above the cylinder head 14 and bearing means 22 between the flange 21 and the inner surface of the cylinder head 14. Movement in the opposite direction is limited by a bearing 23 against the outer or lower face of the cylinder head 14 and a split retainer ring 24 mounted in a groove suitably located in the outer surface of the shaft 20 just below the bearing means 23.

The shaft 20 has a hollow portion 25 in its end which is exposed through the cylinder head 14 and in this hollow portion is adapted to be received a stem connector or adaptor 26 having a noncircular opening 27 therein to engage the noncircular end customarily employed on a valve stem. By this means rotation of the shaft 20 will be caused to rotate the valve stem. The stem connector 26 is keyed to the interior of the hollow 25 of the shaft 20 by means of a suitable key 28.

The opposite end portion of the shaft passes through an opening 29 in the top plate or second cylinder head 17, which is likewise provided with a suitable seal about the shaft in the form of a groove 30 with an O-ring therein or other suitable sealing means. This second cylinder head is also provided with a groove 31 to receive the end of the cylinder 16 which is opposite the bottom plate or first cylinder head 14. An indicator washer 32 may be secured on the shaft 20 exteriorly of the second cylinder head 17 by any suitable means and the upper end of the shaft provided with the driving connection 33 which may be employed if and when desired for manual operation of the valve 1 or other mechanism to which the operator may be connected.

The first and second cylinder heads 14 and 17 may be secured together by any suitable clamping means and in the present instance are illustrated secured together and also secured to the base plate 11 by means of bolts 34 passing through openings in both cylinder heads 14 and 17 and matching holes in the base plate or adaptor plate 11.

It will be understood that the ends of the cylinder 16 may be suitably sealed within the grooves 15 and 31 of the respective cylinder heads so as to provide a fluid tight joint between the cylinder 16 and each of the cylinder heads.

The first cylinder head 14 may be provided with suitable means for introducing pressure fluid into the cylinder adjacent such first cylinder head, in the form of a port 35 connecting the interior of the cylinder with the exterior of the cylinder head 14 and a fluid pressure line 36 connected to such port 35. Similarly, the second cylinder head 17 is provided with a port 37 connected to the upper portion of the interior of the cylinder 16 and to the exterior of the cylinder head 17, and a fluid pressure line 38 is connected to this port 37 so that pressure fluid may be introduced to the interior of the cylinder adjacent its upper end.

Within the cylinder is slidably and rotatably mounted a piston which may be an annular piston as illustrated at 39 having an opening therethrough centrally thereof to receive the shaft 20, said opening being provided with suitable sealing means such as the annular groove 40 for retaining an O-ring as illustrated. Thus a readily slidable and rotatable seal is formed between the annular piston 39 and the shaft 20 which passes therethrough.

Likewise, the outer periphery of the piston 39 is provided with an O-ring groove 41 having an O-ring disposed therein for providing a slidable and rotatable seal within the interior of the cylinder 16. The outer surface of the shaft 20 over which the piston 39 may move being smooth and without interruption, the O-ring within the groove 40 will provide an adequate seal thereagainst with very little frictional resistance to movement of the piston either in an axial or in a rotary direction, and the same is true of the O-ring in the groove 41 providing the seal against the unbroken interior surface of the cylinder 16. Thus the piston 39 is sealed to both the shaft 20 and the cylinder 16, yet is freely movable both in an axial and in a rotary direction with respect to these parts insofar as the seals are concerned.

It will be apparent that the piston 39 may be forced in either axial direction by means of fluid introduced through the pressure fluid line 36 or the pressure fluid line 38 as the case may be and it is intended by this invention that such movement in the one direction or the other will cause fractional rotation of the valve stem or other shaft engaged in the stem connector 26 in the one direction or the other. The means for translating axial movement of the piston 39 as just described into rotary movement of the shaft 20 and hence of the stem or other object engaged within the stem connector 26, includes a linkage system interconnecting the stationary portions of the operator, the piston, and the shaft.

On a suitable stationary portion of the operator such as the first cylinder head 14, at a position exposed toward the piston 39, there is provided an anchor 42 in the form of a pair of lugs integrally carried on the first cylinder head 14. Interconnecting such lugs 42 and the piston is a link 43 which engages not only the lugs 42, but similar lugs 44 on the adjacent surface of the piston. It will be noted that these lugs 42 and 44 are eccentric with respect to the axis of the piston and the shaft 20 and that they are connected by means of universal pivots 45 to the opposite ends of the link 43. Thus as the piston moves toward and away from the first cylinder head 14 it will be caused to rotate relative to the first cylinder head 14 and this rotation will be caused by the link 43 and permitted by the universal nature of the pivots 45.

Similarly the piston 39 is provided with other lugs 46 to which one end of a link 47 is connected, the opposite end of this link being connected to lugs 48. The connections to the lugs 46 and 48 are likewise universal connections or pivots 50. The lugs 48, instead of being carried on a stationary part such as the cylinder head 14 are carried on an arm 49 extending laterally from the shaft 20 and fixed thereon.

Thus it will be seen that axial movement of the piston 39 will produce a relative rotation between the piston 39 and the arm 49 on the shaft 20 in the same manner that axial movement of the piston produces a relative rotation between the piston and the first cylinder head 14. In accordance with this invention in its preferred form the links 43 and 47 will extend in directions with such circumferential components that upon a given axial movement of the cylinder 39 the link 43 will cause rotation of the cylinder 39 with respect to the stationary parts of the assembly in the same direction that the link 47 causes the arm 49 to rotate with respect to the piston 39. Thus the rotative effect of the links 43 and 47 will be additive and the net rotation of the arm 49 and shaft 20 with respect to the stationary parts of the device will be the sum of the rotations caused by such links.

It will be understood that for simplicity's sake only one link 43 and one link 47 is illustrated but that as many such links of each type as desired might be provided. It is further to be noted that while the connection of the link 43 to a stationary part is in the instance illustrated to the first cylinder head 14, it is within the concept of this invention to provide such connection on any stationary part of the device. Furthermore, while for purposes of bearing stability and the like it is preferred that the arm 49 which provides a connection for one end of the link 47 to be located adjacent the first cylinder head 14, the concept of this invention is not necessarily limited to such location and under certain circumstances it might be desirable to have it otherwise located.

As hereinbefore designated, it is intended that the two driving connections provided by the stem connector 26 and the noncircular section 33 on the respective ends of the shaft 20 be for engagement respectively with a valve stem and a manually operated arm or wheel whereby the valve stem may be operated manually as well as by the pressure fluid operator of this invention, such connections may be utilized for other purposes and both may be utilized for driving means from operation of the piston if so desired. The indicator washer 32 preferably has a pointer 51 pointing laterally therefrom and the upper cylinder head 17 has indicia 52 and 53 thereon to indicate the position of the operator and a valve or other mechanism to which it may be secured. Furthermore, depending upon the extent to which the piston 39 is allowed to travel toward the first cylinder head 14, the apparatus may or may not provide a lock against manual operation from the position of the piston illustrated in FIG. 2. In other words, if in the position of the piston illustrated in FIG. 2 the links 43 and 47 are sufficiently near to a plane transverse to the axis of the shaft 20, they will provide a lock against manual rotation of such shaft or rotation thereof by any means other than by axial movement of the piston. The mechanism provided lends itself to the possibility of such locking or no such locking as determined by the position at which the piston may be stopped in its downward movement, as will be understood by anyone ordinarily skilled in this art.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described what is claimed is:

1. A pressure fluid actuated fractional rotation operator comprising, a cylinder, cylinder head means closing at least one end of said cylinder, said cylinder and head combination having port means for conducting power fluid under pressure to the interior of the cylinder adjacent the head means, a driven shaft having a lateral arm thereon, bearing means fixed coaxially relative to said cylinder rotatably carrying said shaft and restraining it from longitudinal movement, a piston mounted in said cylinder in slidable and rotating engagement therewith, and a pair of rigid links both universally pivoted to said piston and each extending therefrom in a direction with a circumferential component, one pivoted at its opposite end to said cylinder head means and the other at its opposite end to said arm, all of said pivots being eccentric to said cylinder, whereby said piston will be caused to rotate relative to said head means and said arm will be caused to rotate relative to said piston when said piston moves longitudinally in said cylinder.

2. A pressure fluid actuated fractional rotation operator in accordance with claim 1 in which said circumferential components of said links are in such direction that, for a given longitudinal movement of the piston, rotation of the arm relative to the piston will be in the same direction as rotation of the piston relative to the cylinder head means.

3. A pressure fluid actuated fractional rotation operator comprising a cylinder, first and second cylinder heads closing the opposite ends of said cylinder, each having a bearing coaxial with the cylinder, and said cylinder and head combination having port means for conducting power fluid under pressure to the interiors of the respective ends of the cylinder, a driven shaft rotatably carried in said bearings and held thereby against longitudinal movement relative to said cylinder, and having a lateral arm thereon within the cylinder adjacent one of said heads, said shaft having one end projecting through one of said heads and providing a driving connection, an annular piston surrounding said shaft in said cylinder in sliding and rotatable engagement with both, and a pair of rigid links, both universally pivoted to said piston and one pivoted at its opposite end to said first cylinder head and the other at its opposite end to said arm, whereby said piston will be caused to rotate relative to said head and said arm will be caused to rotate relative to said piston when said piston moves longitudinally in said cylinder.

4. A pressure fluid actuated fractional rotation operator comprising a cylinder, first and second cylinder heads closing the opposite ends of said cylinder, each having a bearing coaxial with the cylinder, and said cylinder and head combination having port means for conducting power fluid under pressure to the interiors of the respective ends of the cylinder, a driven shaft rotatably carried in said bearings and held thereby against longitudinal movement relative to said cylinder, having a lateral arm thereon within the cylinder adjacent one of said heads, and having its opposite ends exposed through the corresponding heads respectively and providing exposed driving connections, an annular piston surrounding said shaft in said cylinder in sliding and rotatable engagement with both, and a pair of rigid links, both universally pivoted to said piston and one pivoted at its opposite end to said first cylinder head and the other at its opposite end to said arm, whereby said piston will be caused to rotate relative to said head and said arm will be caused to rotate relative to said piston when said piston moves longitudinally in said cylinder.

5. A pressure fluid actuated fractional rotation operator as set forth in claim 4 in which said lateral arm is adjacent said first cylinder head and said rigid links extend in the same axial direction from said piston.

6. A pressure fluid actuated fractional rotation operator as set forth in claim 4 in which said lateral arm is adjacent said first cylinder head and said rigid links both extend in the same axial direction from said piston and in opposite circumferential directions from their respective pivotal connections to said piston.

7. A pressure fluid actuated fractional rotation operator in accordance with claim 4 in which said links extend in such circumferential directions that, for a given longitudinal movement of the piston, rotation of the arm relative to the piston will be in the same direction as rotation of the piston relative to the first head.

References Cited in the file of this patent

UNITED STATES PATENTS

| | | |
|---|---|---|
| 1,284,108 | Hurtquist | Nov. 5, 1918 |
| 2,998,805 | Usab | Sept. 5, 1961 |